United States Patent
Centa

(10) Patent No.: US 10,480,778 B2
(45) Date of Patent: Nov. 19, 2019

(54) INDUCTIVE HEATING ENERGY RECOVERY SYSTEM

(71) Applicant: GOODRICH CORPORATION, Charlotte, NC (US)

(72) Inventor: Timothy Centa, Anaheim, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 286 days.

(21) Appl. No.: 14/517,247

(22) Filed: Oct. 17, 2014

(65) Prior Publication Data

US 2016/0109114 A1  Apr. 21, 2016

(51) Int. Cl.

| H05B 6/42 | (2006.01) |
|---|---|
| H05B 6/10 | (2006.01) |
| F22B 1/28 | (2006.01) |
| B23K 26/322 | (2014.01) |
| B23K 26/362 | (2014.01) |
| B23K 26/361 | (2014.01) |

(52) U.S. Cl.
CPC ............ *F22B 1/281* (2013.01); *B23K 26/322* (2013.01); *H05B 6/108* (2013.01); *H05B 6/42* (2013.01); *B23K 26/361* (2015.10); *B23K 26/362* (2013.01); *H05B 2214/03* (2013.01)

(58) Field of Classification Search
CPC ............... F22B 1/281; H05B 2206/00; H05B 2206/002; H05B 2214/00–04; H05B 6/108; H05B 6/42; H05B 6/02; H05B 6/062–065; H05B 6/14; H05B 6/145; H05B 6/36; H05B 6/38
USPC .......................................... 219/634, 672–677
See application file for complete search history.

(56) References Cited

U.S. PATENT DOCUMENTS

| 4,071,079 | A | * | 1/1978 | Engelbrecht | ............. F22B 1/06 122/32 |
|---|---|---|---|---|---|
| 4,399,657 | A | * | 8/1983 | Berry | ........................ F01D 1/34 290/2 |
| 4,545,365 | A | * | 10/1985 | Wetzel, Jr. | .......... F24D 11/0214 126/610 |
| 4,855,552 | A |  | 8/1989 | Marceau et al. | |
| 5,773,797 | A | * | 6/1998 | Uemura | ................ B24B 49/105 219/628 |
| 5,958,273 | A | * | 9/1999 | Koch | .................... B01J 8/0285 219/651 |
| 6,734,405 | B2 | * | 5/2004 | Centanni | ................... A61L 2/07 219/628 |
| 2003/0230567 | A1 | * | 12/2003 | Centanni | ................... A61L 2/07 219/628 |

(Continued)

FOREIGN PATENT DOCUMENTS

GB     2311197     9/1997

OTHER PUBLICATIONS

Extended European Search Report dated Mar. 17, 2016 in European Application No. 15189902.8.

(Continued)

*Primary Examiner* — Sang Y Paik
(74) *Attorney, Agent, or Firm* — Snell & Wilmer, L.L.P.

(57) ABSTRACT

An energy recovery system is provided. The energy recovery system may comprise an inductive heating coil configured to have a cooling fluid flow through the inductive heating coil and a heat exchanger fluidly coupled to the inductive heating coil and configured to produce a steam source. The steam source drives a pump.

12 Claims, 3 Drawing Sheets

(56) References Cited

U.S. PATENT DOCUMENTS

| | | | |
|---|---|---|---|
| 2005/0035115 A1 | 2/2005 | Anderson et al. | |
| 2005/0242087 A1* | 11/2005 | Anderson | B29C 33/04 219/633 |
| 2012/0103591 A1* | 5/2012 | Tozer | F25D 16/00 165/281 |

OTHER PUBLICATIONS

European Patent Office, Intent to Grant dated Nov. 16, 2017 in Application No. 15189902.8-1808.
Communication pursuant to Article 94(3) EPC dated Jun. 16, 2017 in European Application No. 15189902.8.

\* cited by examiner

INDUCTIVE HEATING ENERGY RECOVERY SYSTEM

FIELD OF INVENTION

The present disclosure relates to induction heating systems, and, more specifically, to an oil-cooled induction heating system to recover heat energy.

BACKGROUND OF THE INVENTION

Induction heating may be used in manufacturing carbon brake parts. Induction heating may consume a large amount of energy to operate in vacuum vessels used in the heating process. At the same time, copper coils used in conventional inductive methods consume electricity and generate heat both in the copper coils and inside of the vessel. The copper coils may be cooled using a variety of methods. However, significant heat energy may leave the system as heat waste as a result of cooling the coils. For example, steam may be evaporated into the atmosphere after cooling the coils. As a result, induction heating operations may leave a large carbon emissions footprint. Furthermore, water cooled induction heating systems may have unacceptably high pressure in the induction coils as the induction coil gets hot and water begins to boil or evaporate.

SUMMARY OF THE INVENTION

An energy recovery system is provided. The energy recovery system may comprise an inductive heating coil configured to have a cooling fluid flow through the inductive heating coil and a heat exchanger fluidly coupled to the inductive heating coil and configured to produce a steam source. The steam source drives a pump.

In various embodiments, the cooling fluid may comprise a liquid-phase heat transfer fluid. The pump may further comprise a steam turbine pump. The pump may comprise a vacuum pump. The inductive heating coil may comprise copper tubing. A steam header may contain the steam source and be in fluid communication with the heat exchanger. A variable frequency drive pump may be fluidly coupled to the inductive heating coil. A ceramic insulating material may be in contact with the inductive heating coil. A fluid storage tank may be configured to store the cooling fluid.

An inductive heating device is also provided. The inductive heating device may comprise a conductive coil, an insulating material proximate the conductive coil, a susceptor proximate the insulating material, and a heat transfer oil in the conductive coil.

In various embodiments, a heat exchanger may be configured to cool the heat transfer oil and produce steam. A vacuum pump may be configured to be driven by the steam. The heat exchanger may use water to cool the heat transfer oil. A variable frequency drive pump may be configured to move the heat transfer oil into the conductive coil. A steam turbine pump may be configured to move the heat transfer oil into the conductive coil.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
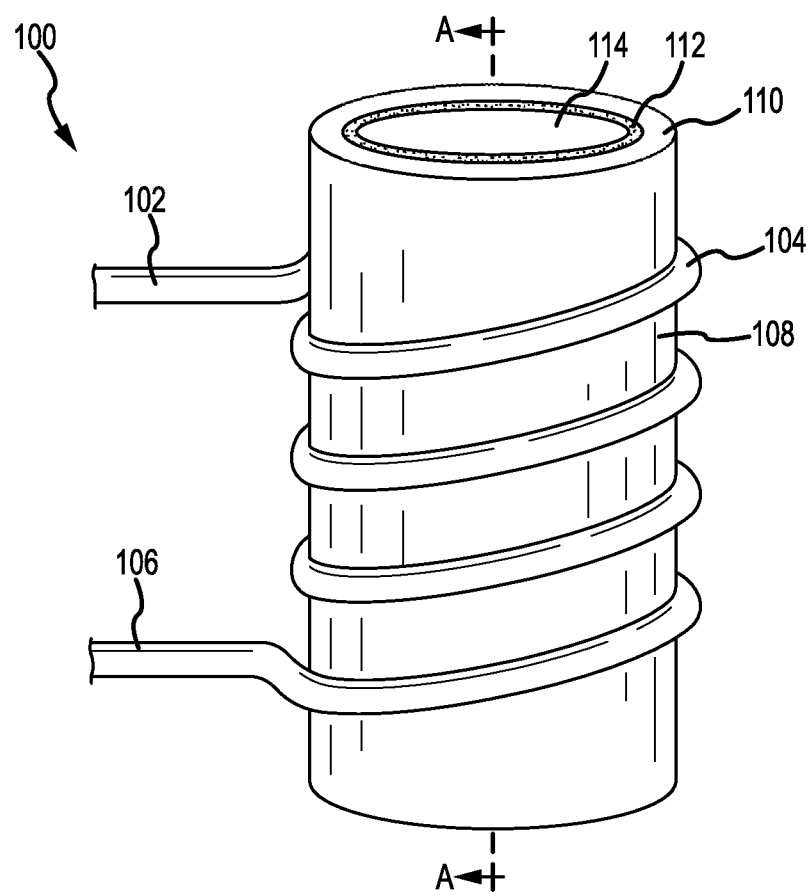
FIG. 1A is an exemplary inductive heating device configured to heat non-metallic parts, in accordance with various embodiments.
Figure 1B:
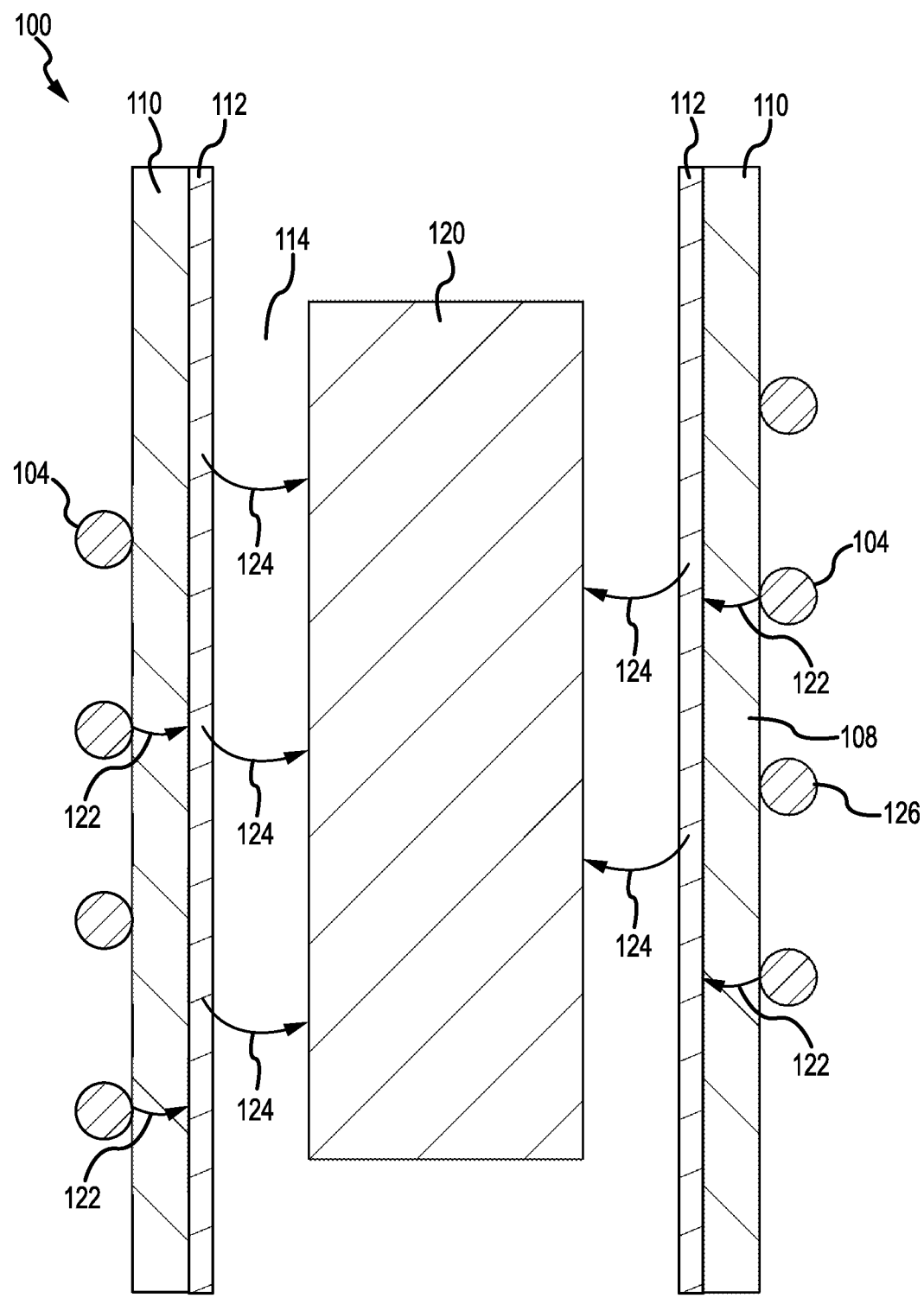
FIG. 1B is a cross-sectional view of an exemplary inductive heating device configured to heat non-metallic parts, in accordance with various embodiments.

In various embodiments, and with reference to FIGS. 1A and 1B, an induction heating system 100 is shown. FIG. 1B illustrates a cross sectional view of induction heating system 100 along plane A-A' as shown in FIG. 1A. Induction heating system 100 comprises an inlet 102. Inlet 102 may be made from conductive tubing (also referred to as conductive conduit) that comprises copper or other electrically conductive metal. The conductive tubing is capable of conducting electricity and containing fluid. Inlet 102 leads into a conductive coil 104 made from conductive conduit to serve as an inductive heating coil. Conductive coil 104 may wind around vessel 108 and feed into outlet 106. Outlet 106 may also be made from conductive tubing. A cooling fluid may flow through inlet 102 into conductive coil 104 and out outlet 106. Cooling fluid 126 absorbs heat from vessel 108 and, thus, cooling fluid 126 leaves outlet 106 at a higher temperature than the cooling coil had entering inlet 102.

In various embodiments, an insulating material 110 may be adjacent conductive coil 104. Insulating material 110 may insulate conductive coil 104 from susceptor 112 and hot zone 114. Insulating material 110 may be carbon bonded carbon fiber insulation. Insulating material 110 may also be a ceramic insulating material to enable conductive coil 104 to operate at temperatures above 460° F. (238° C.). Insulating material 110 may substantially enclose susceptor 112. Susceptor 112 may comprise a conductive material with high resistivity to generate heat in response to a current in conductive coil 104. Susceptor 112 may be made of graphite, molybdenum, silicon carbide, stainless steel, niobium, aluminum, and/or any other conductive material. Susceptor 112 defines the volume of hot zone 114. Susceptor may heat hot zone 114 by conduction and/or radiation.

In various embodiments, and with reference to FIG. 1B, inlet 102 and outlet 106 may server as conductive leads to conductive coil 104. A current may run through conductive coil 104. The current in conductive coil 104 may create magnetic field 122 that induces current in susceptor 112. Susceptor 112 will heat as the induced current passes over and/or through the resistive material of susceptor 112. Susceptor 112 may emit radiant heat 124 to heat material 120 in hot zone 114. The susceptor may reach surface temperatures exceeding 3,000° F. (1649° C.). During heating, the conductive coil may reach temperatures up to 500° F. (260° C.) or higher. Cooling may protect conductive coil 104 from damage resulting from high temperatures.

In various embodiments, cooling fluid 126 may flow through conductive coil 104. Cooling fluid may be a fluid selected to avoid reaching a vapor or boiling phase when flowing through conductive coil 104 at temperatures up to 500° F. (260° C.) or higher. Cooling fluid 126 may be a high-temperature, liquid-phase heat transfer fluid. For example, cooling fluid 126 may comprise a commercially available heat transfer oil. In various embodiments, cooling fluid 126 comprises a mixture of severely hydrotreated and hydrocracked hydrocarbons such as that available under the trademark DURATHERM 600 and/or a mixture of hydrogenated terphenyl, terphenyl, and quater- and higher, partially hydrogenated polyphenyls, such as that available under the trademark THERMINOL 66.

Figure 2:
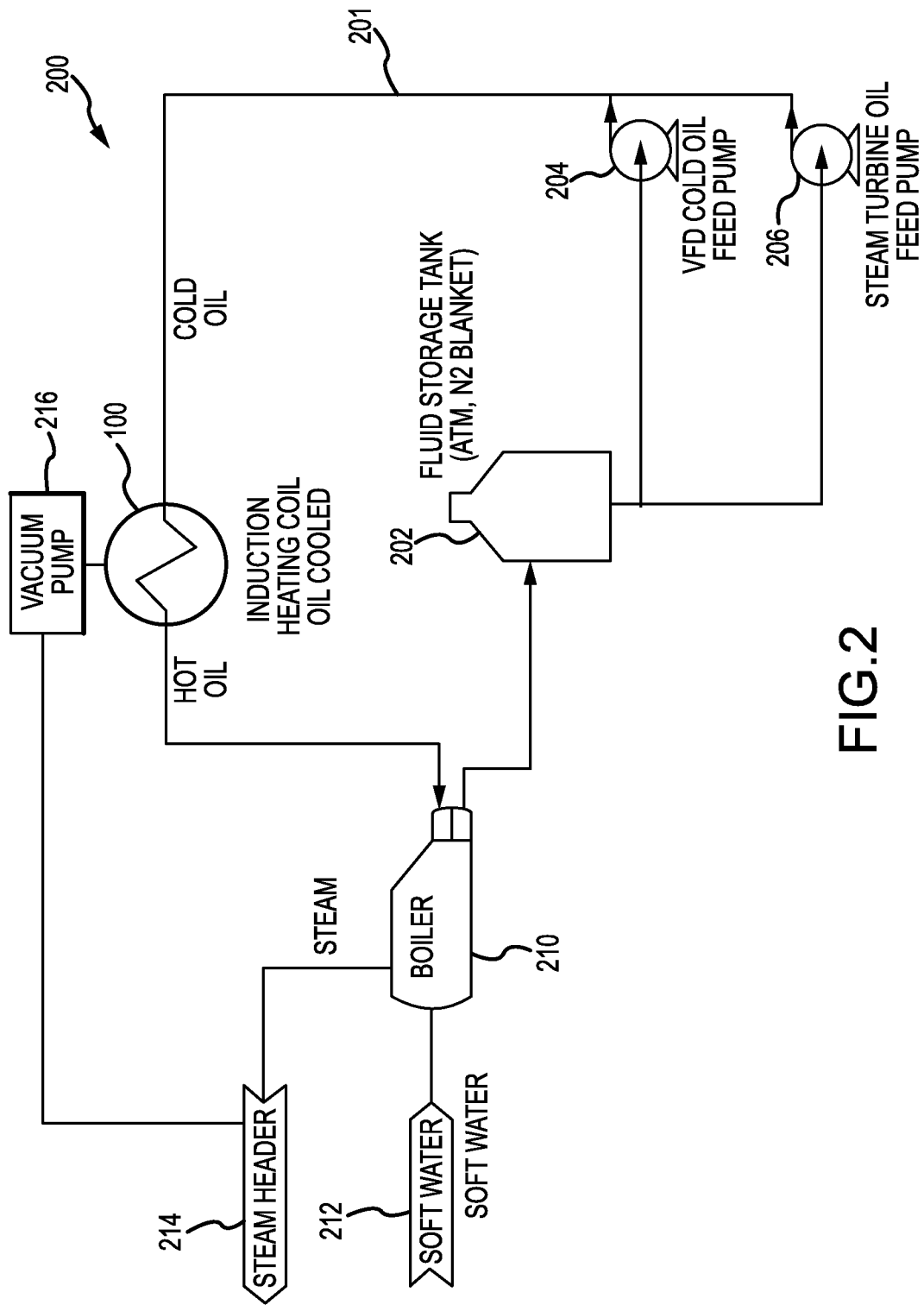
FIG. 2 illustrates an oil-cooled induction heating system configured to recover heat energy in the form of steam, in accordance with various embodiments.

In various embodiments, and with reference to FIG. 2, an energy recovery system 200 is shown with induction heating system 100 (as illustrated in FIGS. 1A and 1B). Energy recovery system 200 includes a fluid storage tank 202 to serve as a reservoir for cooling fluid 126. Fluid storage tank 202 may be configured to store cooling fluid 126. In that regard, fluid storage tank may be a nitrogen-blanketed, oil storage tank to prevent cooling fluid 126 from oxidizing. A regulator may maintain a desired temperature of nitrogen gas to prevent oxygen from entering the system. The nitrogen blanket and fluid storage tank 202 provide a volume buffer as cooling fluid 126 expands and contracts with temperature fluctuations.

In various embodiments, cooling fluid 126 stored in fluid storage tank 202 may be pumped through system by pumps 204 or pumps 206. Pumps 204 may comprise one or more variable frequency drive pumps. Pumps 204 may require an external energy source such as fossil fuels or electricity. Pumps 206 may comprise one or more steam turbine pumps. In that regard, pump 206 may be powered by steam generated by energy recovery system 200. Pumps that are redundant to pumps 204 or pumps 206 may be integrated into the system to provide continuous uptime of the cooling system and prevent overheating damage to induction heating system 100.

In various embodiments, pump 204 and pump 206 may be fluidly coupled to inlet 102, conductive coil 104, and outlet 106 of inductive heating system 100 as well as fluid storage tank 202 and heat exchanger 210 by a conduit 201. In that regard, pump 204 and pump 206 move cooling fluid 126 through energy recovery system 200. Conduit 201 may comprise any material suitable for carrying cooling fluid 126 at the contemplated operating temperatures. For example, conduit 201 may comprise stainless steel tubing or other suitable tubing. Cooling fluid 126 flows from pumps 204 and/or pumps 206 to cool conductive coil 104 of induction heating system 100. Cooling fluid 126 may be approximately 360° F. (182° C.) when cooling fluid 126 reaches inlet 102. Cooling fluid 126 may absorb heat energy from conductive coil 104 and may reach temperatures up to approximately 430° F. (221° C.) or higher at outlet 106.

In various embodiments, after heating, cooling fluid 126 may flow into heat exchanger 210. Heat exchanger 210 may also be referred to as a boiler. Heat exchanger 210 may comprise a heat exchanger configured to transfer heat energy from cooling fluid 126 into water to produce steam. In that regard, heat exchanger 210 may place cooling fluid 126 in close proximity to water so that heat is transferred from cooling fluid 126 to water. Cooling fluid 126 may be cooled down to approximately 360° F. (182° C.). Water may be provided at water intake 212. Water in water intake 212 may be water provided by condensing steam or from a water source. Water in water intake 212 may have a minimal mineral content and, in various embodiments, water may comprise distilled water, reverse osmosis treated water, and the like. Water in water intake may also be soft water, i.e., substantially free of Ca, Mg and Mn but may contain K or Na. Cooling fluid 126 may be cooled by heating the water in heat exchanger 210 and producing steam. The steam may be driven to steam header 214. Steam in steam header 214 may be used in induction heating system 100 to create a vacuum. Steam header 214 is a repository of steam used to do work throughout a plant. For example, steam header 214 drives a vacuum pump 216 (e.g., a vacuum ejector) that draws a vacuum in vessel 108 (of FIG. 1A). Steam header 214 may also drive pump 206 that provides motive pressure for cooling fluid 126. Other steam sources may provide steam to steam header 214 to augment steam produced by energy. Steam leaving heat exchanger 210 may be approximately 350° F. (177° C.) to 380° F. (193° C.). In various embodiments, the steam temperature may be anywhere from 212° F. (100° C.) to 500° F. (260° C.). The steam temperature or volume may be augmented by cracking natural gas using another heat source to provide additional thermal energy at the desired temperature.

In various embodiments, induction heating system 100 may be configured to operate with up to 50% of the steam used to operate induction heating system 100 provided by energy recovery system 200. Induction heating system 100 may also be configured to rely on energy recovery system to provide up to 80% of the steam used to operate induction heating system 100. In that regard, energy recovery system 200 may improve plant efficiency by reducing the need for heat energy from outside energy sources to produce steam.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An energy recovery system of an inductive heating system, comprising:
   a vacuum vessel;
   an inductive heating coil wound around the vessel and configured to have a cooling fluid flow through the inductive heating coil;
   a boiler including a heat exchanger fluidly coupled to the inductive heating coil and configured to produce a steam source;
   a vacuum pump driven by the steam source and configured to draw a vacuum in the vacuum vessel; and
   an oil pump driven by the steam source and fluidly coupled to an inlet of the inductive heating coil and in fluid communication with the heat exchanger.

2. The energy recovery system of claim 1, wherein the cooling fluid comprises a liquid-phase heat transfer fluid.

3. The energy recovery system of claim 2, wherein the oil pump is a steam turbine pump driven by the steam source.

4. The energy recovery system of claim 3, wherein the inductive heating coil comprises copper tubing.

5. The energy recovery system of claim 4, further comprising a steam header to contain the steam source, wherein the steam header is in fluid communication with the boiler.

6. The energy recovery system of claim 5, further comprising a variable frequency drive pump fluidly coupled to the inductive heating coil.

7. The energy recovery system of claim 6, further comprising a ceramic insulating material in contact with the inductive heating coil.

8. The energy recovery system of claim 7, further comprising a fluid storage tank in fluid communication with the heat exchanger configured to store the cooling fluid.

9. The energy recovery system of claim 1, further comprising:
   an insulating material proximate the conductive coil;
   a susceptor proximate the insulating material;
   a heat transfer oil in the conductive coil;
   said heat exchanger configured to cool the heat transfer oil and produce said steam source.

10. The energy recovery system of claim 9, wherein the heat exchanger uses water retained by the boiler to cool the heat transfer oil to produce steam within the boiler.

11. The energy recovery system of claim 10, further comprising a variable frequency drive pump configured to move the heat transfer oil into the conductive coil.

12. The energy recovery system of claim 11, wherein the oil pump is a steam turbine pump configured to move the heat transfer oil into the conductive coil, wherein the vacuum pump comprises a vacuum ejector configured to receive steam from the steam header and in response draw the vacuum in the vacuum vessel.

* * * * *